United States Patent
Liao et al.

(10) Patent No.: US 7,134,767 B2
(45) Date of Patent: Nov. 14, 2006

(54) STRUCTURE FOR IMPROVING BACKLIGHT UNIFORMITY

(75) Inventors: Cheng-Min Liao, Chung Li (TW); Wen-Yu Lin, Taipei (TW)

(73) Assignee: Chunghwa Picture Tubes (TW)

( * ) Notice: Subject to any disclaimer, the term of this patent is extended or adjusted under 35 U.S.C. 154(b) by 46 days.

(21) Appl. No.: 10/898,202

(22) Filed: Jul. 26, 2004

(65) Prior Publication Data

US 2006/0018127 A1    Jan. 26, 2006

(51) Int. Cl.
*F21S 4/00*    (2006.01)

(52) U.S. Cl. ...................................... 362/225; 362/613

(58) Field of Classification Search ................ 362/604, 362/611, 613, 614, 225, 260, 217, 800; 349/58, 349/59; 40/367, 564; 313/493
See application file for complete search history.

(56) References Cited

U.S. PATENT DOCUMENTS 5,709,460 A * 1/1998 Lester ......................... 362/147
6,820,997 B1 * 11/2004 Bissada ....................... 362/216

* cited by examiner

*Primary Examiner*—Ali Alavi

(57) ABSTRACT

A method for improving backlight uniformity is disclosed in which the two outermost lamps near each of the two sides of the back plate are positioned higher than the other lamps. Hence, the outermost lamps are closer to the scattering plate, thus improving the brightness at the two sides of the LCD panel such that various illumination and the shadows generated in specific regions on the LCD panel are avoided.

10 Claims, 5 Drawing Sheets

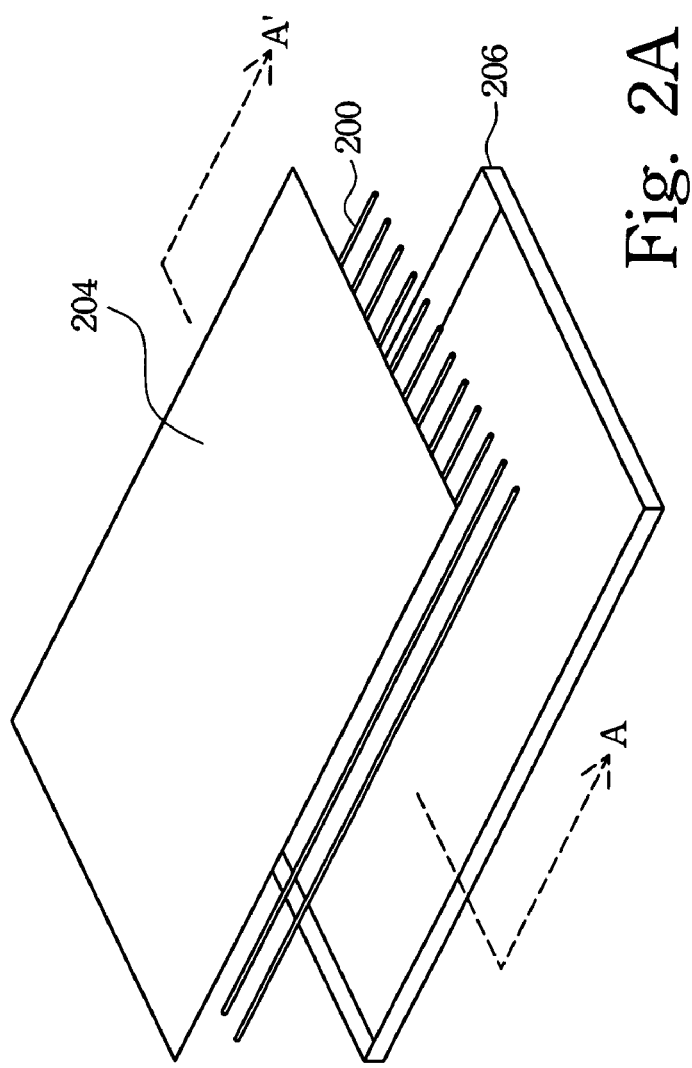
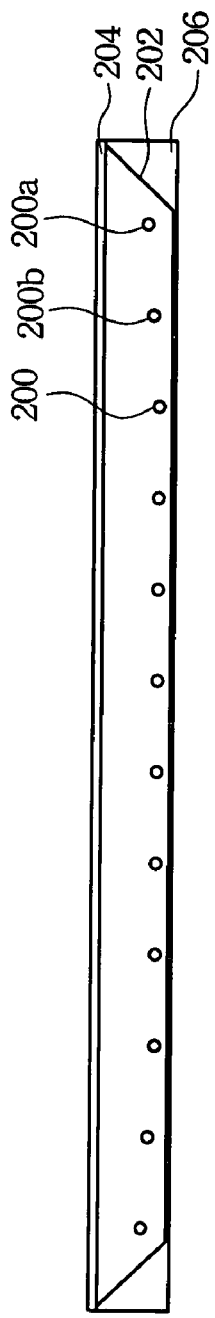
Fig. 2A
Fig. 2B

_US 7,134,767 B2_

STRUCTURE FOR IMPROVING BACKLIGHT UNIFORMITY

FIELD OF THE INVENTION

The present invention relates to a liquid crystal display, and more particularly, to a structure for improving backlight uniformity of a direct-lit liquid crystal display.

BACKGROUND OF THE INVENTION

Liquid crystal does not illuminate any light by itself. Therefore, an external light source is required in a liquid crystal display (LCD). Typically, a backlight module is used in a transmission thin film transistor (TFT) liquid crystal display (LCD) for providing required light. Cold cathode fluorescent lamps (CCFLs) or light emitting diodes (LEDs) are the light source in a backlight module. A high brightness efficiency and a long lifetime make the cold cathode fluorescent lamps (CCFLs) popular for use in backlight modules.

Light modules can be divided into two types, back and front. The back type can be further divided into two types, edge-lit and direct-lit. The edge-lit backlight module can provide an average brightness with an efficiency of about 50%. Moreover, the edge-lit backlight module is thin and lightweight. Therefore, it can be used in a portable color LCD. In comparison, the brightness efficiency of the bottom-lit backlight module is about 60%. However, it is heavier and thicker. Therefore, the bottom-lit backlight module is always used in LCD monitors and LCD televisions.

Furthermore, when the LCD monitor is larger than 17 inches, the weight of the bottom-lit backlight module is actually less than the weight of the edge-lit backlight module. Therefore, there is no advantage to using the edge-lit backlight module for large-scale LCD televisions, and the trend is to use the bottom-lit backlight module instead.

Referring to FIG. 1A, a schematic top view of a conventional bottom-lit backlight module is illustrated. Several CCFLs 100 are arranged in parallel to each other so as to provide light to a LCD panel (not shown in this figure). FIG. 1B illustrates a schematic sectional view along the AA' line of FIG. 1A. The light emitted from the CCFLs 100 is reflected by the reflective plate 102. The reflected light is diffused by the scattering plate 104 to provide a uniform backlight to the LCD panel. However, the image displayed on the LCD panel is often degraded by what appear to be various illumination and shadows, which are caused by the presence of the CCFLs arranged underneath the panel. A backlight module that does not cause the various illumination and shadows on the display is thus required.

SUMMARY OF THE INVENTION

The main purpose of the present invention is to provide a backlight module. A plurality of lamps positioned at different heights is used in the module to improve the brightness uniformity.

Another objective of the present invention is to provide a method for improving backlight uniformity so as to improve the definition of the image shown on a LCD display.

According to the structure for improving backlight uniformity in the present invention, the two outermost lamps near each of the two sides of the bottom plate are positioned higher than the other lamps. In other words, the lamps, four in total, are located closer to the scattering plate, thus improving the brightness uniformity at the two sides of the LCD panel. Such an arrangement avoids the generation of various illumination and shadows in specific regions on the LCD panel.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 2A illustrates a schematic exploded view of a bottom-lit backlight module according to the preferred embodiment of the present invention;

FIG. 2B illustrates a schematic cross-sectional view along the AA' line of FIG. 2A of a bottom-lit backlight module according to the preferred embodiment of the present invention;

DETAILED DESCRIPTION OF THE PREFERRED EMBODIMENT

FIG. 2A illustrates a schematic exploded view of a direct-lit backlight module according to the preferred embodiment of the present invention. A plurality of cold cathode fluorescent lamps (CCFLs) 200 is arranged in a bottom plate 206 to provide light to a LCD panel. Light emitting diodes (LEDs), organic Light-Emitting Diodes (OLEDs), tungsten halogen lamps, electroluminescent devices (ELDs), cathode luminescent lamps, or high intensity discharged lamps can also be used as the backlight. A scattering plate 204 is located over the CCFLs 200 so as to improve the brightness uniformity.

FIG. 2B illustrates a schematic cross-sectional view along the AA' line of FIG. 2B of a bottom-lit backlight module according to the preferred embodiment of the present invention. The light emitted from the CCFLs 200 is reflected by the reflective plate 202. The reflected light is diffused by the scattering plate 204 to provide a uniformly lit LCD panel. According to the present invention, the two outermost CCFLs 200 near each of the two sides of the back plate are positioned higher than the other lamps and thereby closer to the scattering plate 204. Such an arrangement improves the brightness uniformity at the two sides of the back plate so as to avoid the various illumination and shadows generated around the LCD panel.

Figure 1A:
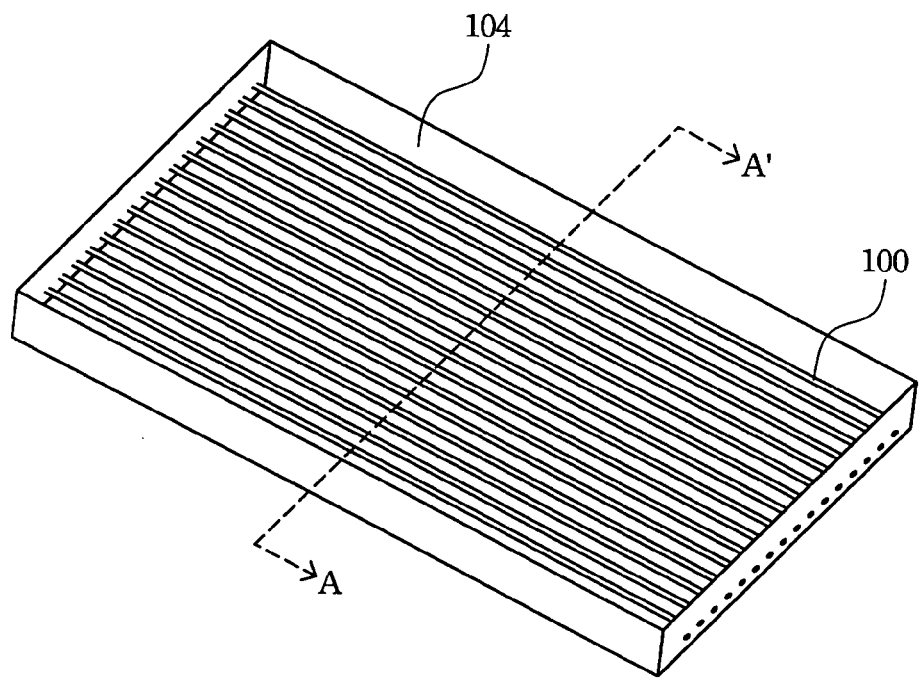
FIG. 1A illustrates a schematic top view of a conventional bottom-lit backlight module.
Figure 1B:
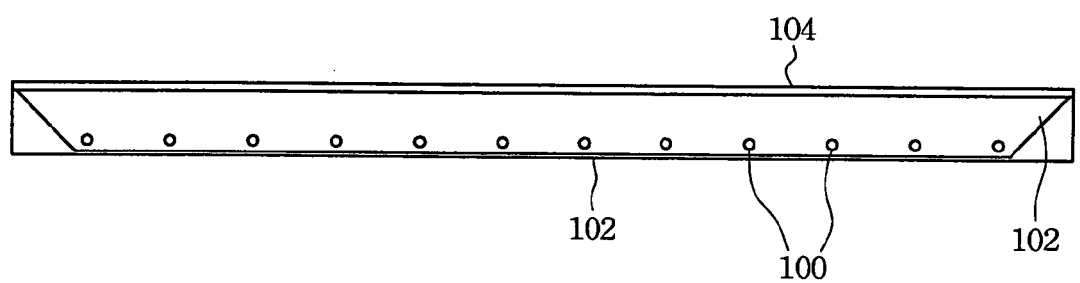
FIG. 1B illustrates a schematic cross-sectional view along the AA' line of FIG. 1A.
Figure 3:
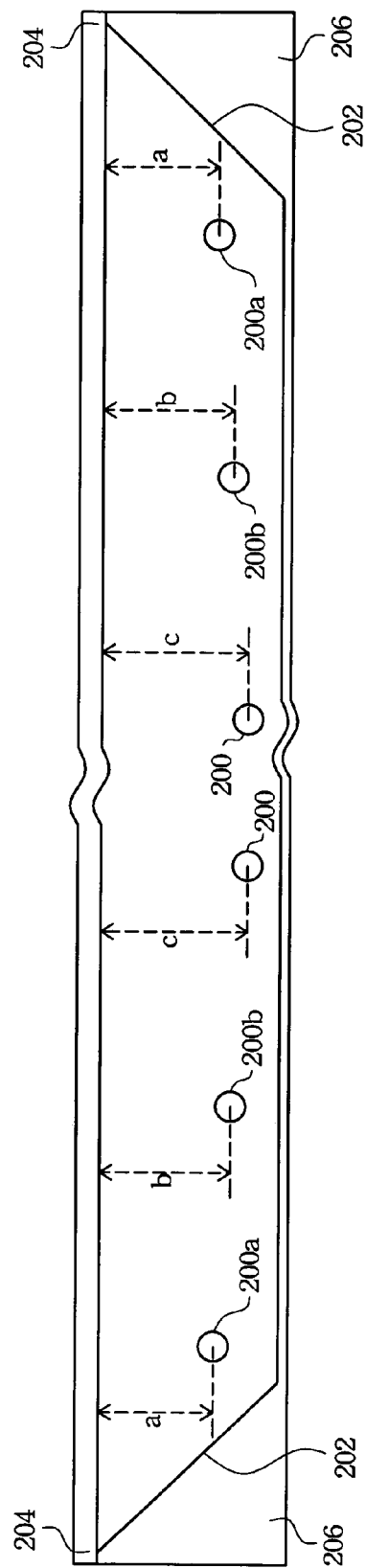
FIG. 3 illustrates a cross section enlarged diagram of the backlight module according to the preferred embodiment of the present invention.
Figure 4:
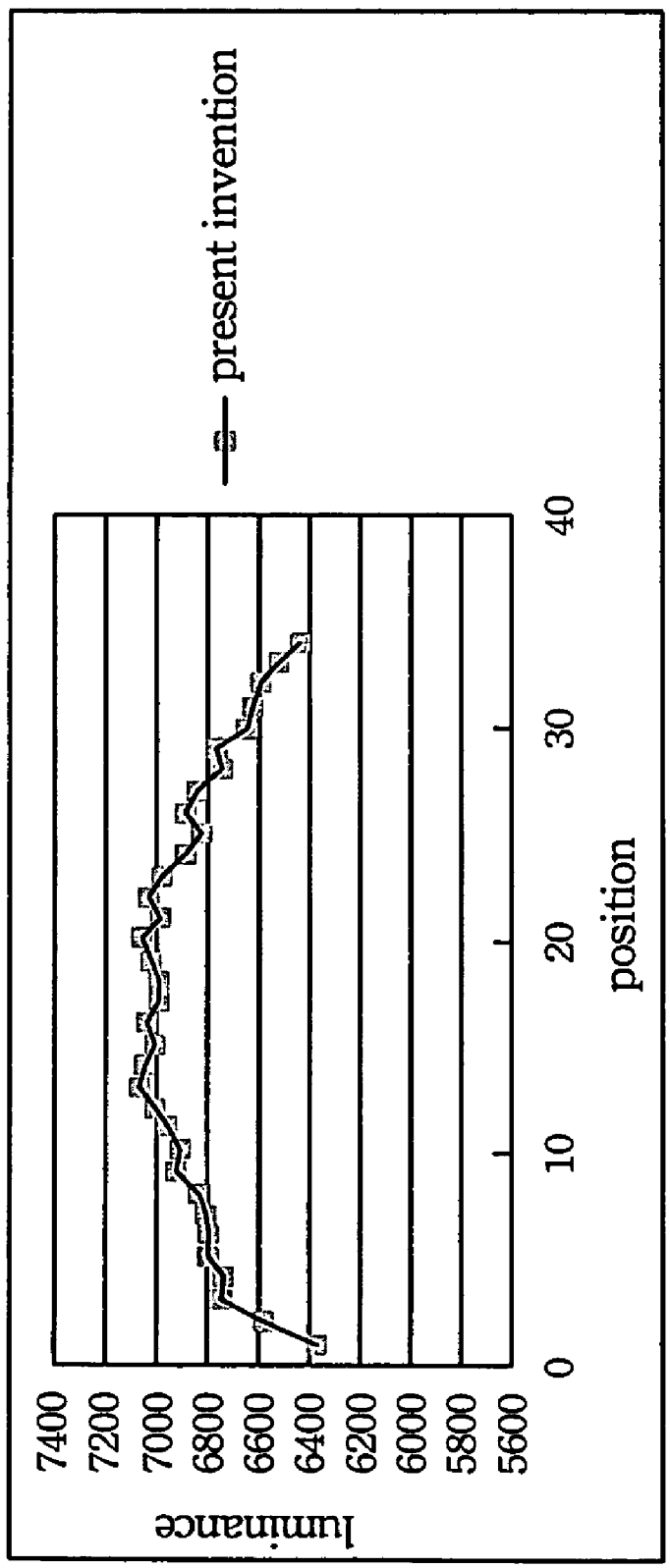
FIG. 4 illustrates a brightness comparison diagram between the two sides and the central part, wherein the brightness of the two sides is about 86% to 96% of the brightness of the central part.

FIG. 3 illustrates an enlarged diagram of the backlight module according to the preferred embodiment of the present invention. The light emitted from the CCFLs 200 is reflected by the reflective plate 202. The reflected light is diffused by the scattering plate 204 to provide a uniformly lit LCD panel. The two CCFLs 200a and 200b are situated at different heights compared with the CCFLs 200. The distance between the CCFL 200*a* and the scattering plate 204 is a. The distance between the CCFL 200*b* and the scattering plate 204 is b. The distance between the CCFL 200 and the scattering plate 204 is c. The relationship among the distances a, b, and c is c>b>a. The brightness in the middle of the LCD panel is greater than the brightness at the two sides of the LCD panel when using the typical backlight module to provide backlight. Therefore, the two CCFLs 200*a* and 200*b* in the present invention are located closer to the scattering plate 204 in order to improve the brightness at the two sides of the LCD panel. According to the present invention, the brightness of the two sides is about 86% to 96% of the brightness of the central part as shown in the FIG. 4.

Figure 5:
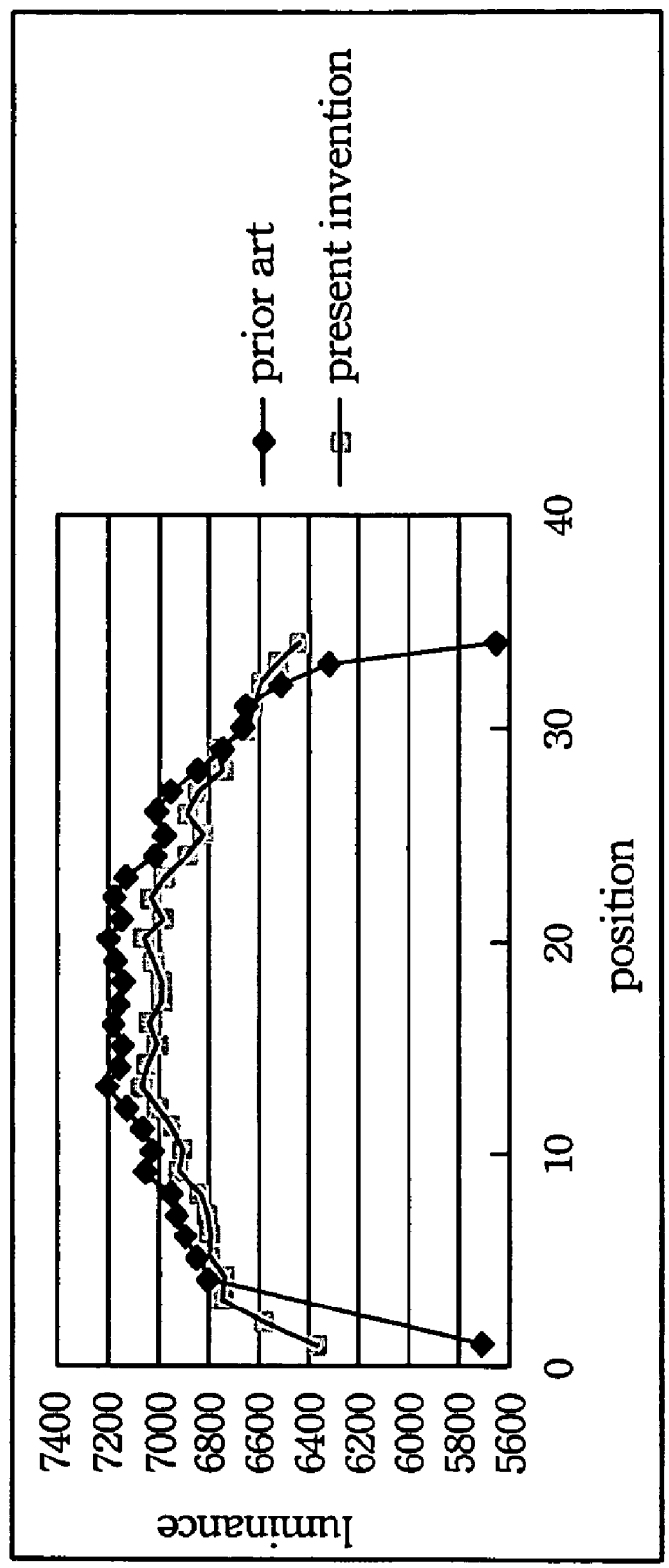
FIG. 5 illustrates a brightness comparison diagram between the prior art and the present invention.

FIG. 5 illustrates a brightness comparison diagram between the prior art and the present invention. From FIG. 5, the brightness of the two sides is much lower than the brightness of the central part in the prior art. However, the brightness of the two sides is almost equal to the brightness of the central part in the present invention. In other words, the method and structure of the present invention can much improve the brightness distribution.

According to the preferred embodiment of the present invention, the height difference between the CCFL 200*a* and the CCFL 200 is about 1 mm to 5 mm. The height difference between the CCFL 200*b* and the CCFL 200 is about 0.5 mm to 2 mm.

According to the backlight module in the present invention, the two outermost CCFLs near each of the two sides of the back plate are situated closer to the scattering plate, thus improving the brightness at the two sides of the LCD panel. Such an arrangement avoids the generation of various illumination and shadows in specific regions on the LCD panel.

As is understood by a person skilled in the art, the foregoing preferred embodiments of the present invention are illustrative of the present invention rather than limiting of the present invention. It is intended that this description cover various modifications and similar arrangements included within the spirit and scope of the appended claims, the scope of which should be accorded the broadest interpretation so as to encompass all such modifications and similar structure.

What is claimed is:

1. A backlight module structure, comprising:
   a back plate;
   a scattering plate located over said back plate;
   a plurality of lamps located between said back plate and said scattering plate, a first distance exists between the outermost lamps near two sides of said back plate and said scattering plate, a second distance exists between the lamps adjacent to said outermost lamps and said scattering plate, wherein said second distance is larger than said first distance.

2. The backlight module structure of claim 1, wherein a third distance exists between the other lamps and said scattering plate and said third distance is not less than said second distance.

3. The backlight module structure of claim 1, wherein said lamps are cold cathode fluorescent lamps.

4. The backlight module structure of claim 3, wherein said lamps are arranged in parallel to each other.

5. The backlight module structure of claim 4, wherein the distance between any two adjacent lamps are the same.

6. The backlight module structure of claim 1, wherein said lamps are light emitting diodes.

7. The backlight module structure of claim 6, wherein the distance between any two adjacent lamps are the same.

8. The backlight module structure of claim 1, wherein said lamps are Organic Light-Emitting Diodes (OLEDs).

9. The backlight module structure of claim 8, wherein the distance between any two adjacent lamps are the same.

10. The backlight module structure of claim 1, wherein the brightness of the two sides is about 86% to 96% of the brightness of the central part.

* * * * *